United States Patent [19]

Hofmann

[11] 4,151,958

[45] May 1, 1979

[54] FUEL INJECTION NOZZLE

[75] Inventor: Karl Hofmann, Neckarrems, Fed. Rep. of Germany

[73] Assignee: Robert Bosch GmbH, Stuttgart, Fed. Rep. of Germany

[21] Appl. No.: 881,986

[22] Filed: Feb. 28, 1978

[30] Foreign Application Priority Data

Mar. 9, 1977 [DE] Fed. Rep. of Germany ....... 2710216

[51] Int. Cl.$^2$ ............................................. B05B 1/30
[52] U.S. Cl. ................................................. 239/533.3
[58] Field of Search ........................ 239/533.3–533.12

[56] References Cited

U.S. PATENT DOCUMENTS

| | | | |
|---|---|---|---|
| 3,339,848 | 9/1967 | Geiger | 239/533.4 X |
| 3,612,407 | 10/1971 | Itano | 239/533.12 X |

FOREIGN PATENT DOCUMENTS 866574 7/1949 Fed. Rep. of Germany ........ 239/533.4

Primary Examiner—Robert W. Saifer
Attorney, Agent, or Firm—Edwin E. Greigg

[57] ABSTRACT

A fuel injection nozzle including in assembly the following essential components: a nozzle body; a needle valve and a control member. Two stages of injection are produced both of which are controlled by the needle valve. The control member serves during the second stage of injection and cooperates with the needle valve to effect this stage of injection. For this purpose the control member fits, in a radially sealed manner, within a blind bore formed in the needle valve and defines a channel through which fuel flows under the control of the needle valve. The channel in turn is connected with injection opens for the injection of fuel during the second stage of injection.

15 Claims, 4 Drawing Figures

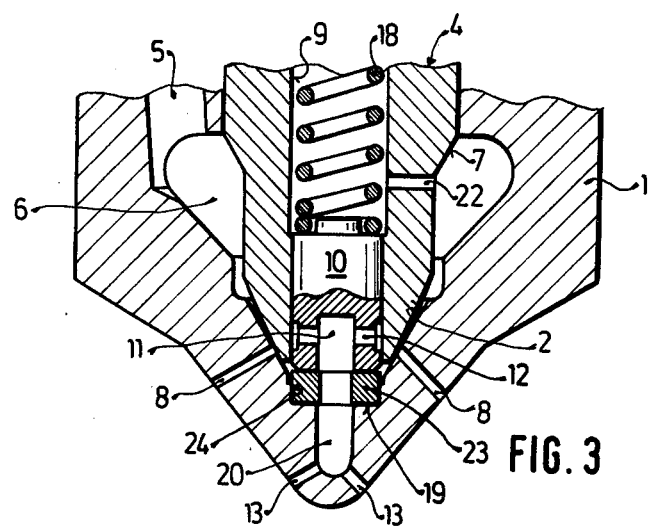
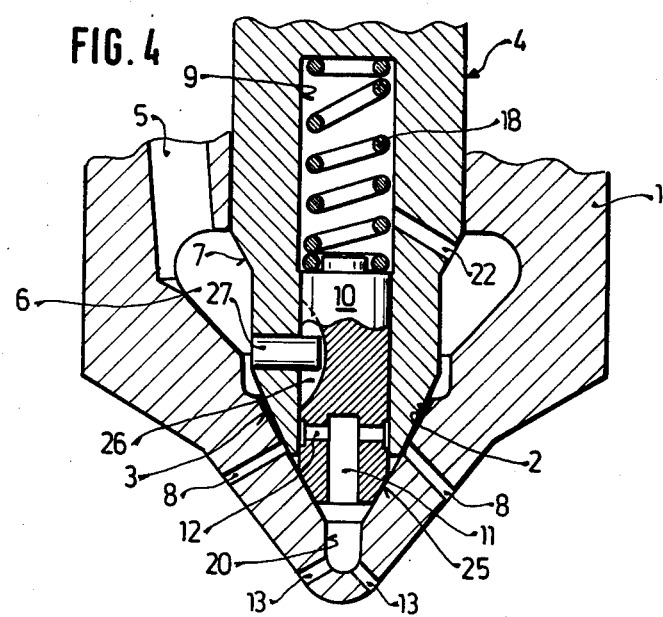

FUEL INJECTION NOZZLE

BACKGROUND OF THE INVENTION

The invention relates to fuel injection nozzles, and in particular to a fuel injection nozzle for internal combustion engines which exhibit two stages of injection. Such nozzles typically have: a valve needle, which controls a fuel exit area that has two successive, separated, at least single injection openings, and has a closing cone portion; a nozzle body defining a valve seat, with the closing core portion cooperating with the valve seat to control the area that was opened earlier; and a control member that serves to control the area subsequently opened, with the control member being arranged so as to be relatively axially movable in a blind bore of the valve needle that is open toward a corresponding injection opening.

In a known fuel injection nozzle of this type the control member is lifted as a drag link away from its associated valve seat after a certain needle stroke and thereby frees a second fuel exit area. The carrier device of the drag link, however, is expensive for reasons of efficiency in production and also wears out, so that the opening control point of the second injection area gradually is pushed back over time, which is disadvantageous for the noise production of the engine. This is especially disadvantageous in diesel engines, which operate without a precombustion chamber. In these direct-injection engines, in addition to the exact point in time of the opening of the second injection area, the manner of opening also plays a role. Thus it is somewhat desirable, that the second fuel exit area is opened gradually, for example between idling and low partial load, toward full load. The disadvantages of an unsatisfactory control is the relatively great roughness in the transitional rpm range, as well as a worsening of the fuel consumption, the exhaust and the performance.

OBJECT AND SUMMARY OF THE INVENTION

It is, therefore, a principal object of the invention to provide a fuel injection nozzle in which the structure for effecting the subsequent or second stage of injection is improved.

This object is achieved by the fuel injection nozzle of the invention, in which two exit areas (injection openings) are successively opened. The control takes place on one hand by means of the commonly known valve cone portion of the needle valve and on the other hand by a pin member, which projects into a blind bore of the needle valve, and which has a channel leading to the second injection location that is controlled by the needle valve.

The fuel injection nozzle according to the invention, with the distinguishing characteristics recited in the claims, in contrast to the known fuel injection nozzles, has the advantage of a cost-favorable embodiment, connected with a very precise injection control even over longer periods of operation, which has a favorable effect on fuel consumption, the exhaust, and the performance especially in the transitional rpm range between idling and full load.

BRIEF DESCRIPTION OF THE DRAWINGS

Three exemplary embodiments of the object of the invention are shown in the drawings and are described in greater detail in the following specification. Shown are:

FIGS. 2 and 3 — a second exemplary embodiment with a control member pressed against a flat seat, and FIG. 4 — a third exemplary embodiment, in which the control member is pressed against a conical seat.

DESCRIPTION OF THE PREFERRED EMBODIMENTS

Figure 1:
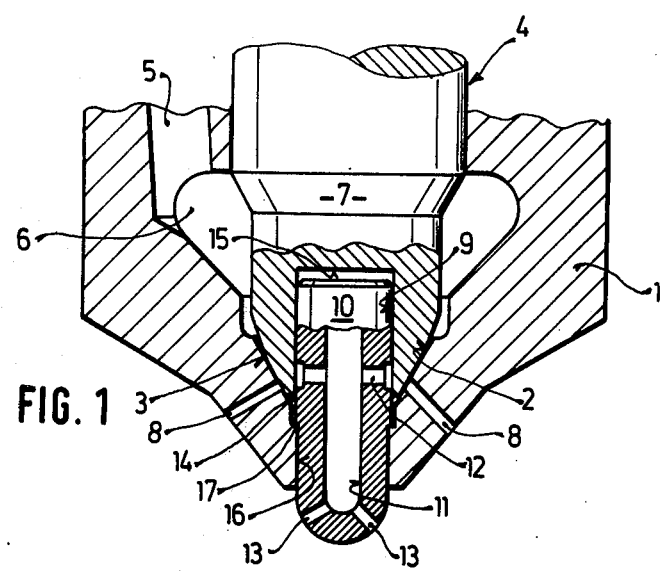
FIG. 1 — a first exemplary embodiment with a control member attached to the nozzle body.

FIGS. 1 through 4 each show a longitudinal section through the portion of the fuel injection nozzle that contains the valve seat. In all of the exemplary embodiments a valve seat 2 is arranged in a nozzle body 1, on which a closing cone portion 3 of a needle valve 4 lies. The fuel arrives under pressure from a fuel injection pump (not shown) through a pressure channel 5 (only partially shown) into a pressure chamber 6, which is arranged between and defined by the nozzle body 1 and the needle valve 4, and there acts in the opening direction upon a pressure shoulder 7 arranged on the needle valve 4. The shoulders 7 form a transition portion between the closing cone portion 3 and the main body portion of the needle valve 4. When there is sufficient pressure in the pressure chamber 6, the needle valve 4 is pushed against a closing force, usually provided by a closing spring (not shown), so that the fuel travels out of the pressure chamber 6 to the injection openings 8, which begin in the valve surface 2 and open directly into the combustion chamber (not shown) of the internal combustion engine. When the injection nozzle is closed the injection openings 8 are directly covered by the sealing cone portion 3.

A blind bore 9 is arranged in the needle valve 4, into which a control member 10 projects, in a sealed and radially guided manner. A channel or additional blind bore 11 is arranged in the control member 10, which is intersected by a transverse bore 12. The bore 12 provides a connection to injection openings 13. As soon as the needle valve 4 is pushed further open in the higher partial load range, as the amount of fuel supplied from the injection pump increases, the transverse bore 12 is opened by the lower control edge 14 of the closing cone portion 13 of the needle valve 4, thereby connecting the pressure chamber 6 with the injection openings 13. When there is a lower supply demand on the injection pump, the only injection that occurs takes place through the injection openings 8, while when there is a larger supply demand both the injection openings 8 and the injection openings 13 are used. Usually the directions of injection provided by the openings are different, in order to obtain thereby an injection cone, i.e., a spreading effect that varies with the load.

In the exemplary embodiment shown in FIG. 1, the control member 10 is arranged rigidly in the nozzle body 1. The blind bore 11 is open at its upper end, and the injection openings 13 branch off from its closed end. When the fuel from the pressure chamber 6 arrives in the blind bore 11, it flows directly into the blind bore 9 and acts on its frontal surface 15, operating in the opening direction of the needle valve 4. The control member 10 can be pressed into the bore 16 of the nozzle body 1 that contains it, but it can also be welded in or soldered in. A shoulder 17 preferably serves for adjustment.

The fitting of the control member 10 into the blind bore 9 takes place before the placement of the control member 10 into the nozzle body 1. In this manner machining to fine tolerance is relatively simple and thereby cost-favorable, because no special tools are necessary for this fine tolerance machining. In addition the opening point of the transverse bore 12 by the edge 14, that is the opening of the second fuel exit area can be selected differently for different engines, in that the different axial position of the control member 10 to the nozzle body 1 is chosen before the attachment.

Figure 2:
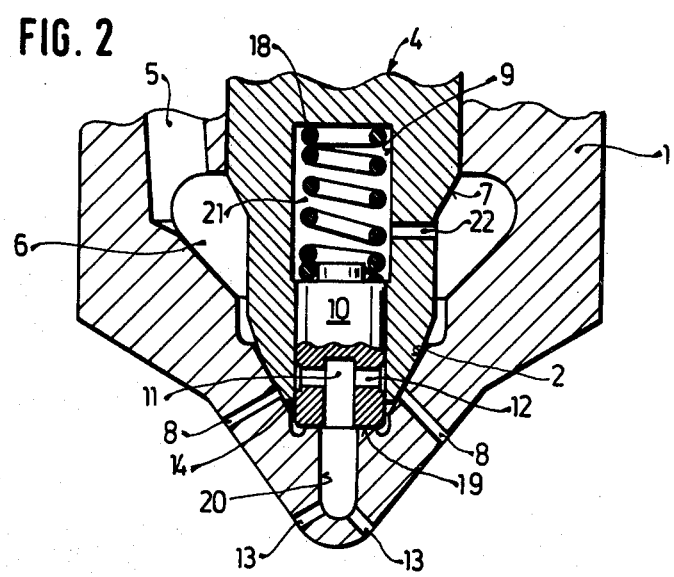

In the two further exemplary embodiments shown in FIGS. 2 through 4 the control member 10 is pressed against a shoulder 19 of the nozzle body 1 by a spring 18, which is arranged in the blind bore 9. By means of the spring 18 the control member 10 is pressed against the shoulder 19 even during the opening stroke of the needle valve 4. The blind bore 11 is open downward in these exemplary embodiments and opens into a blind hole 20 of the nozzle body 1, from which the injection openings 13 branch off. The section 21 of the blind bore 9, which includes the spring 18, is connected with the pressure chamber 6 of the injection nozzle by means of a bore 22. In this manner the prevailing pressure in the pressure chamber 6 acts on the rear side of the control member 10 and presses it supplementarily against the shoulder 19 of the nozzle body. The opening control function of the secondarily opened fuel exit area takes place as with the first exemplary embodiment, in that the lower control edge 14 of the valve needle opens the transverse bore 12, which is arranged in the control member 10.

In the second exemplary embodiment shown in FIGS. 2 and 3 the shoulder 19 is formed as a flat seat. In this manner first of all, an especially simple machining is possible in order to maintain a sufficient seal during seating; and secondly, a certain axial tolerance of the needle valve with the valve seat and the control member with its seat (shoulder) is allowable, without giving rise to the danger of losing the seal.

In the variation of the second exemplary embodiment shown in FIG. 3 a ring 23 is preferably pressed into a corresponding recess between the seat 19 and the control member 10. The ring 23 can be selectively made of a material that is especially suited for a seat of this nature, in order to maintain a favorable pairing of the material with the control member 10. The thickness of the ring determines the stroke necessary to open the transverse bore 12, which stroke will vary in different types of engines. If a large stroke is necessary, a thin ring 23 is selected, for a short stroke the opposite is true.

In the third exemplary embodiment shown in FIG. 4, the shoulder 19 is formed conically as a cone 25, but it is otherwise identical to the second exemplary embodiment. Here the conical surface defining the valve seat 2 is extended downward to form the shoulder 19 and ends directly in the blind hole 20. The shoulder 19 formed as the cone 25 of the control member 10 that lies against this seat is properly ground for a good seal. The grinding takes place when the control member is placed in the needle valve 4, in order to avoid any deviations from a circular form. But to prevent any turning of the control member 10, which could have the result of deviating the conical axis of the cone 25 and the valve cone portion 3, a non-penetrating longitudinal groove 26 is arranged in the outer surface of the control member 10, in which longitudinal groove 26 a guide pin 27 engages, which is arranged in the needle valve 4 to project radially into the blind bore 9. This guide pin 27 also prevents the control member 10 from falling out when the needle valve 4 is removed from the fuel injection nozzle.

In the illustrated embodiments, the injection openings are formed either in the control member 10 (FIG. 1) or in the nozzle body 1 (FIGS. 2-4). In either case, the structural portion containing the injection openings forms an integral extension of the control member 10 or of the nozzle body 1. As an alternative to the above, the structural portion could be a separate piece which is connected, for example, by screw threads, to the control member 10 or the nozzle body 1.

What is claimed and desired to be secured by Letters Patent of the United States is:

1. In a fuel injection nozzle for internal combustion engines including a nozzle body and a needle valve assembly, said nozzle body having a wall through which at least two spaced fuel injection openings extend for directing fuel outwardly from the nozzle body, said wall defining a surface which serves as a valve seat for the needle valve, said needle valve having a closing cone portion that is operatively associated with the valve seat defining surface for controlling the fuel flow through the injection openings, the improvement comprising:

a blind bore formed within the needle valve;

a control member located to be continually in form-fitting engagement with the nozzle body and dimensioned to be radially sealed when received within the blind bore of the needle valve, said control member defining a channel through which fuel flows under the control of said closing cone portion of said needle valve; and means connected to the nozzle body and needle valve assembly to be operatively associated with said channel, said means defining at least one additional fuel injection opening which receives fuel from said channel when the needle valve has completed a predetermined opening stroke.

2. The fuel injection nozzle as defined in claim 1, wherein the control member further defines a transverse bore which intersects said channel, and the opening of which is controlled by the closing cone portion of said needle valve.

3. The fuel injection nozzle as defined in claim 2, wherein the closing cone portion of said needle valve includes a control edge which controls the opening of the fuel injection openings through said nozzle body and said transverse bore.

4. The fuel injection nozzle as defined in claim 1, wherein the injection openings through said nozzle body intersect the valve seat defining surface.

5. The fuel injection nozzle as defined in claim 1, wherein the nozzle body further has an axial bore within which the control member is arranged.

6. The fuel injection nozzle as defined in claim 5, wherein the control member is firmly pressed within the axial bore.

7. The fuel injection nozzle as defined in claim 5, wherein the control member is formed as a tubular section within which said channel is defined, said channel forming a blind bore with its open end facing the needle valve and with its closed end including said at least one additional fuel injection opening, and wherein the control member further defines a transverse bore which intersects said channel, and the opening of which is controlled by the closing cone portion of said needle valve.

8. The fuel injection nozzle as defined in claim 1, wherein the improvement further comprises:

a spring mounted within the blind bore formed within the needle valve and engaging therein the closed end of the blind bore and the control member, wherein the nozzle body further has a shoulder and blind bore defined by said wall, with said channel communicating with and opening into the blind bore defined by said wall, wherein the control member is biased into engagement with said shoulder by said spring, and wherein said at least one additional fuel injection opening is formed in said wall for communicating with the blind bore defined by said wall.

9. The fuel injection nozzle as defined in claim 8, wherein the improvement further comprises:

a ring mounted between said shoulder and said control member, said ring being radially held by said shoulder.

10. The fuel injection nozzle as defined in claim 8, wherein said shoulder defines a contact surface which extends at right angles to the axis of the needle valve, said contact surface being engaged by said control member, said contact surface permitting radial sliding of said control member.

11. The fuel injection nozzle as defined in claim 8, wherein said channel defines an open end which communicates with the blind bore defined by said wall and a closed end facing the blind bore formed within the needle valve.

12. The fuel injection nozzle as defined in claim 11, wherein the nozzle body and needle valve define a pressure chamber into which pressurized fuel is delivered, and wherein the needle valve further has a bore formed therein which communicates with both the pressure chamber and the blind bore formed within the needle valve.

13. The fuel injection nozzle as defined in claim 8, wherein said shoulder defines a conical contact surface.

14. The fuel injection nozzle as defined in claim 13, wherein the conical contact surface is an extension of the surface which serves as a valve seat.

15. The fuel injection nozzle as defined in claim 8, wherein the improvement further comprises:

a pin mounted to the valve needle, wherein said control member further defines a longitudinal groove into which said pin extends in order to prevent turning of said control member relative to said needle valve.

* * * * *